Sept. 8, 1959     C. R. BUSCH     2,903,098
RAILWAY CAR BRAKE MECHANISM
Filed Dec. 21, 1955     5 Sheets-Sheet 2
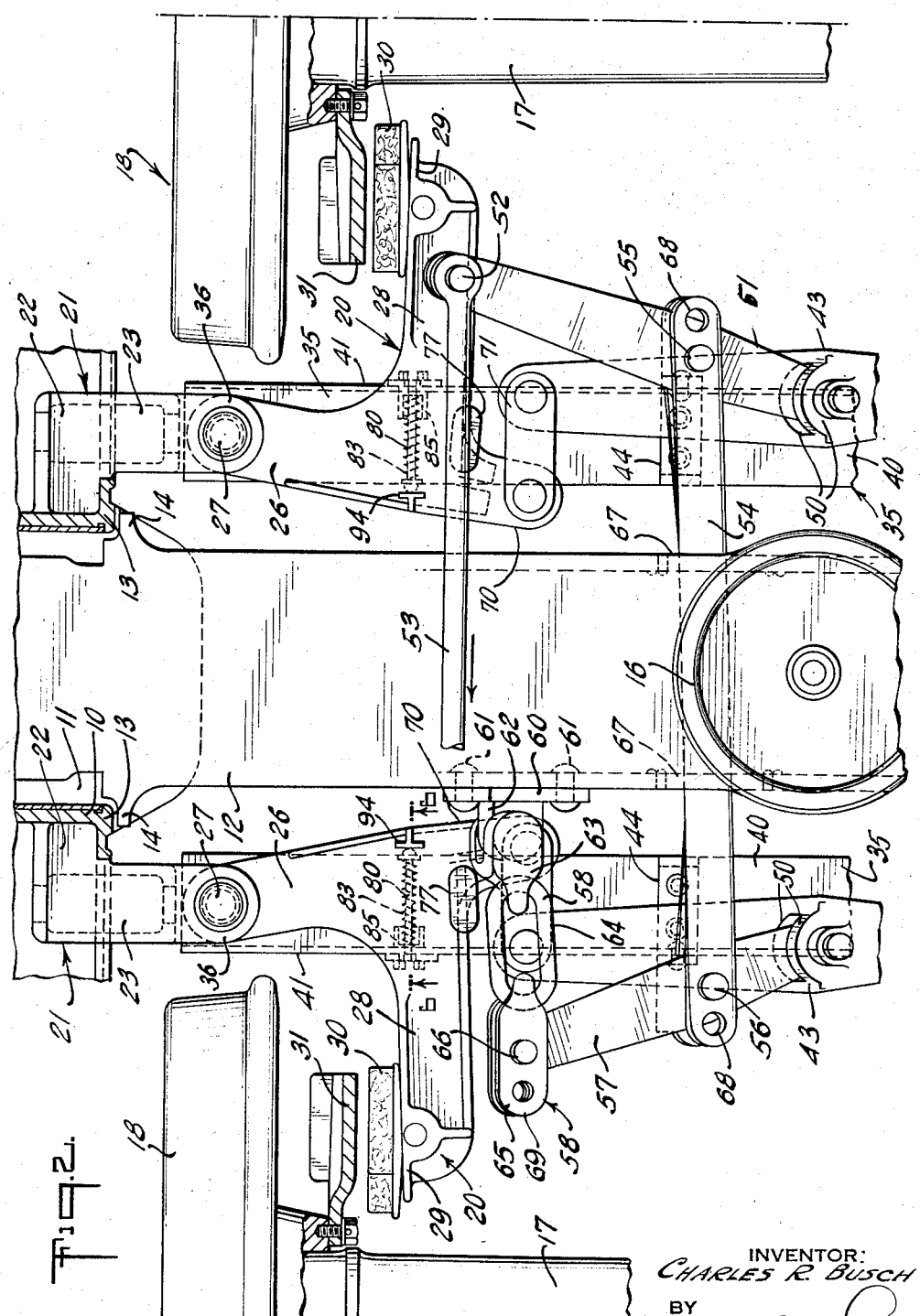
INVENTOR:
CHARLES R. BUSCH
BY
Morrison, Kennedy, Campbell
ATTORNEYS Sept. 8, 1959
C. R. BUSCH
2,903,098
RAILWAY CAR BRAKE MECHANISM
Filed Dec. 21, 1955
5 Sheets-Sheet 3
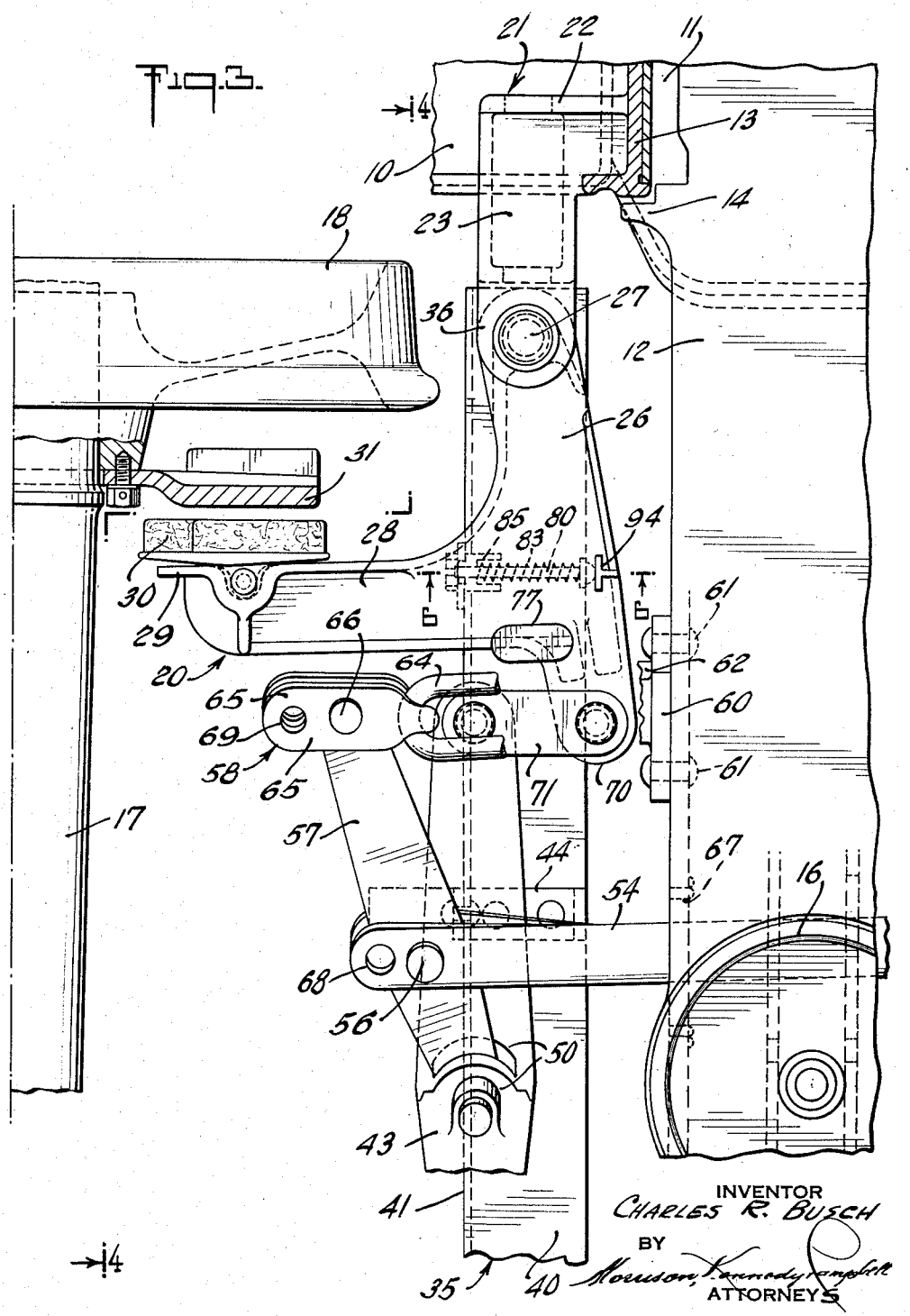
INVENTOR
CHARLES R. BUSCH
BY
Morrison, Kennedy & Campbell
ATTORNEYS

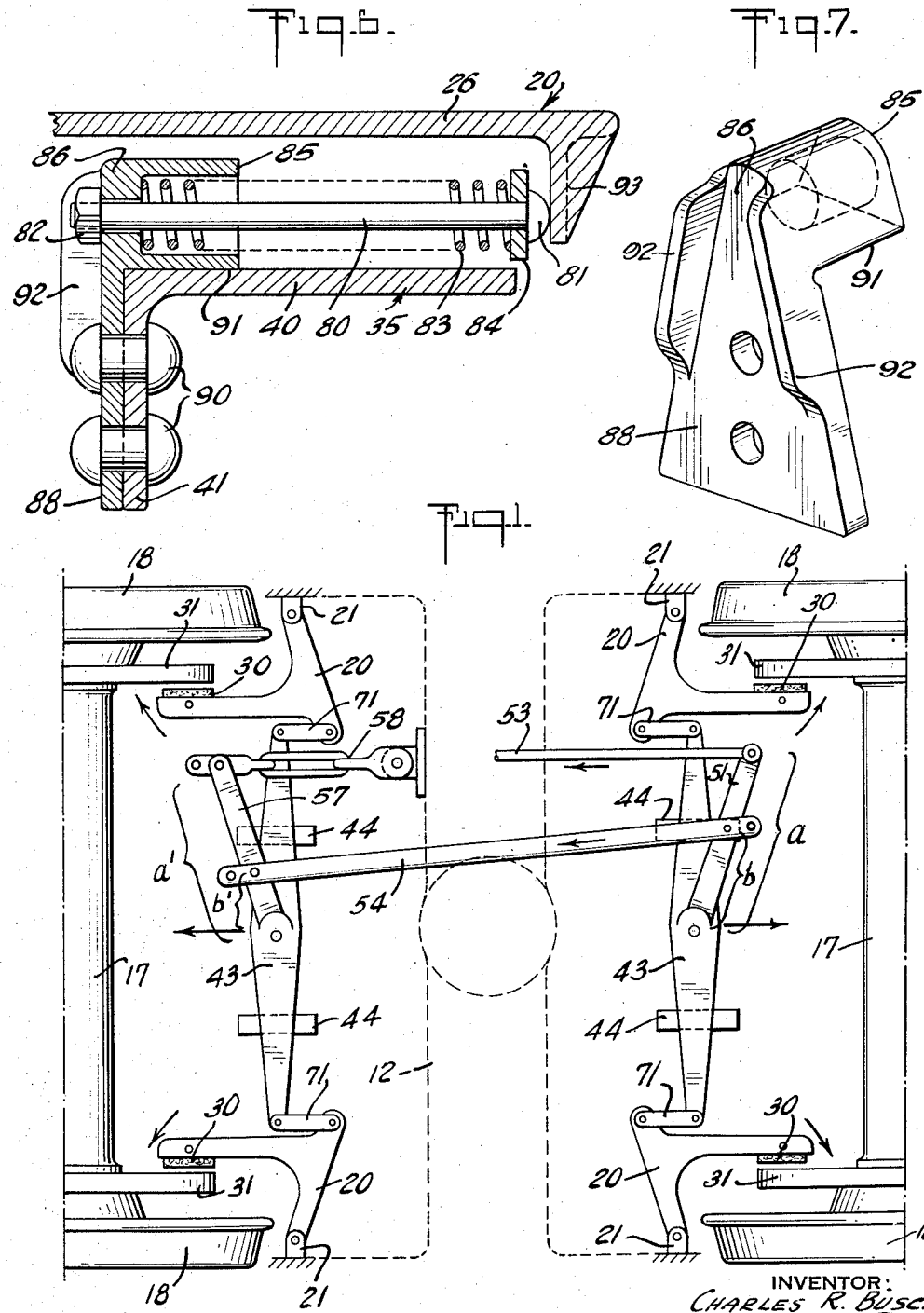

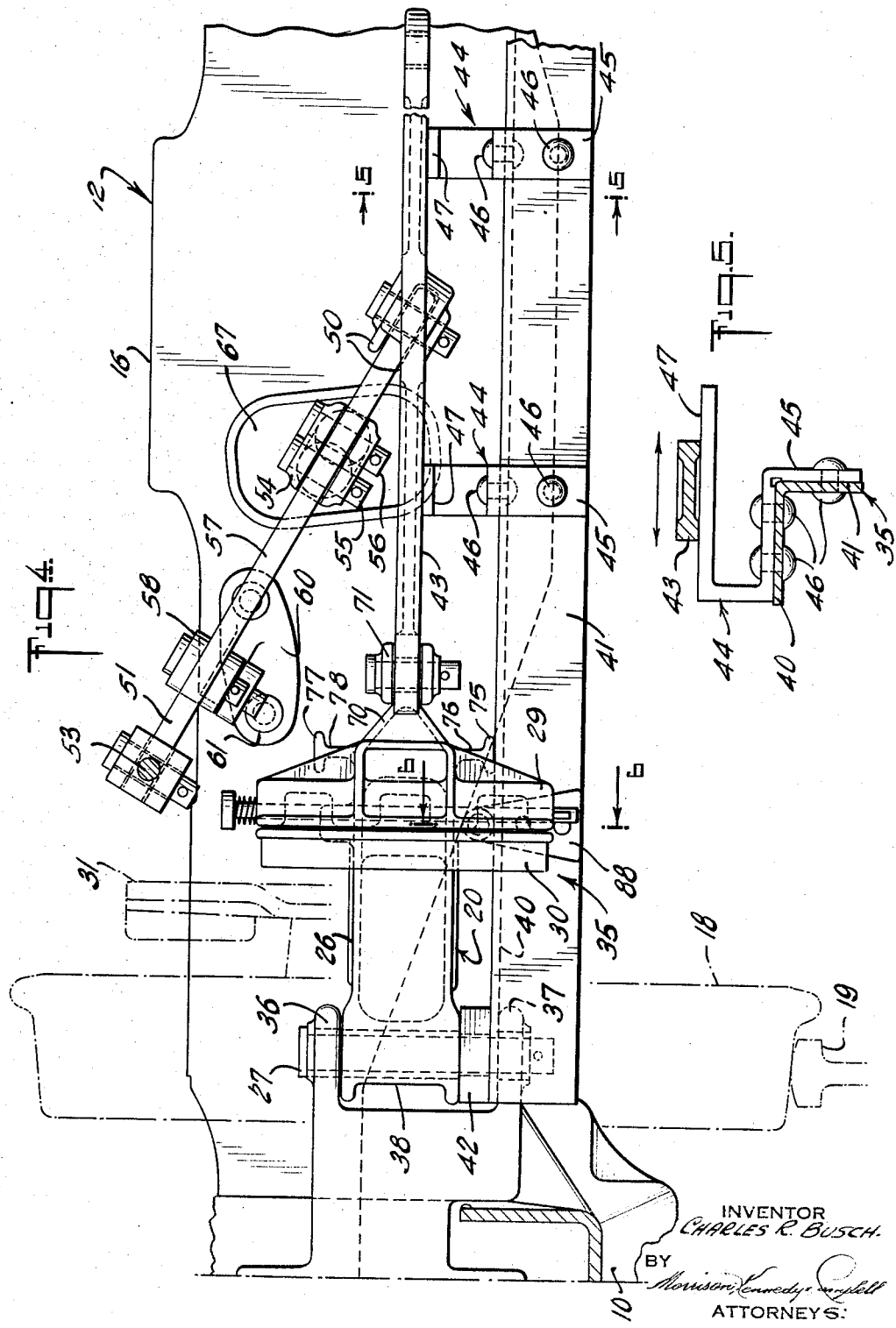

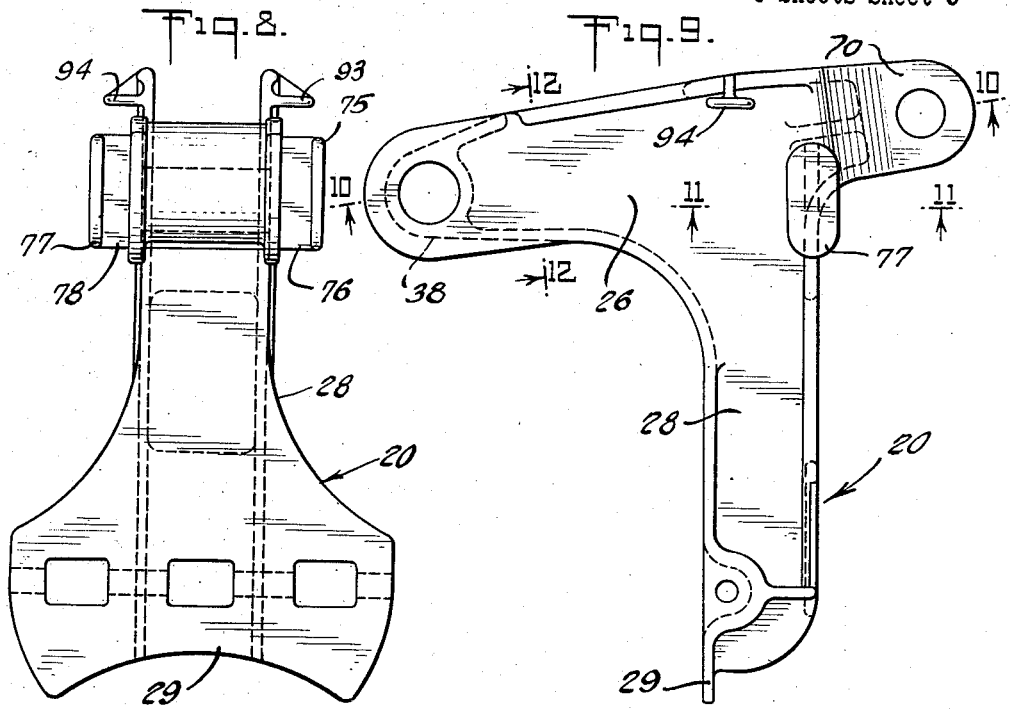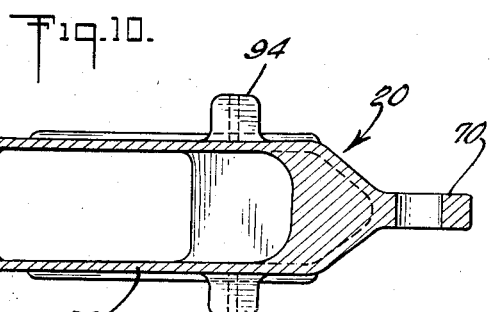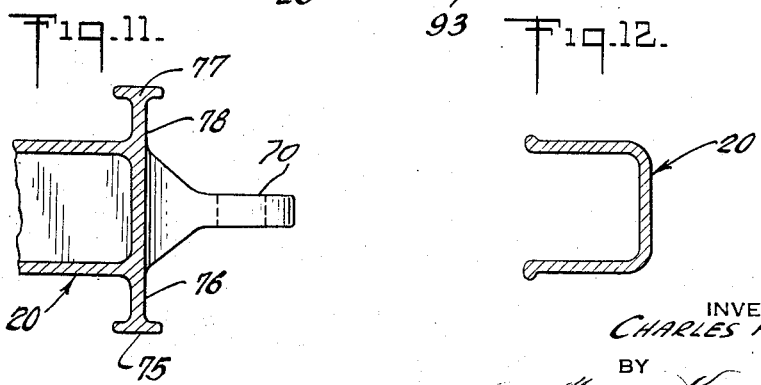

2,903,098

RAILWAY CAR BRAKE MECHANISM

Charles R. Busch, Orange, N.J., assignor to Buffalo Brake Beam Company, a corporation of New York Application December 21, 1955, Serial No. 554,476

14 Claims. (Cl. 188—59)

The present invention relates to railway car brake mechanisms, especially of the freight type and of the general type shown and described in copending application Serial No. 491,838, filed March 3, 1955 and copending application Serial No. 532,635, filed September 6, 1955.

In the railway car brake mechanism disclosed in the aforesaid applications, four linkages in each car truck powered from a single source, operate brakes against brake discs rotatable with respective car wheels. The car body is mounted on a truck bolster spring-supported on its ends on the side frames of the truck, and each of the linkages comprises an L-shape brake head lever, having one leg extending along the bolster and pivotally connected to a bracket affixed to the side frame and having the other leg extending transversely of the bolster and carrying the brake head for the brake shoe. Power is applied to the brake head levers of each car truck through a bridle beam extending horizontally across the center line of the car truck with its middle region substantially on said center line. The intermediate section of this beam is supported from the car body by a lever power-actuated by a pull rod from a remote source of power. A horizontal equalizer bar connected at the ends to the side frame brackets on each side of the bolster, supports, steadies and guides the two brake head levers on the same side of the bolster. The equalizer bar on the side of the bolster along which the power applying bridle beam extends, supports the beam in horizontal position and guides said beam in its horizontal movements.

In the constructions of the aforesaid applications, the brake head levers are operated from the bridle beam by brake arms pivotally joined intermediate their ends to the brake head levers, respectively. The two brake arms on the same side of the truck bolster as the bridle beam are connected to and operated directly from the bridle beam, while the brake arms on the opposite side of the bolster are operated by push rods, pivotally connected to opposed brake arms on opposite sides of the bolster and passing through the bolster. The bolster must be provided with special openings near opposite ends to accommodate these push rods, and should be reinforced in the regions of these openings to compensate for the weakening engendered by the provision of these openings. Therefore, there must be provided for this purpose, special bolsters, which distinguish mainly from bolsters of the conventional type now employed in connection with brake mechanisms of the brake beam type exemplified in U.S. Patent No. 2,170,112, in which the bolster merely has an opening near the center to permit passage therethrough of a connecting rod pivotally joining a dead lever and a live lever forming part of the brake operating mechanism.

Also, in the constructions of the aforesaid applications Nos. 491,838 and 532,635, no positive means are provided for returning the brake head levers into inoperative position upon release of the braking power.

One object of the invention is to provide a new and improved railway brake mechanism of the general type referred to in the aforesaid applications Nos. 491,838 and 532,635, which has a lesser number of operating parts and which consequently is of simpler construction.

Another object of the invention is to provide a new and improved railway brake mechanism of the general type referred to in the aforesaid applications Nos. 491,838 and 532,635, which is designed to permit the use of simpler conventional forms of bolster, such as those employed in connection with brake mechanisms of the brake beam type.

A further object of the invention is to provide a new and improved railway brake mechanism of the general type referred to in the aforesaid applications Nos. 491,838 and 532,635, designed to positively return the brake levers into inoperative positions upon release of the braking power.

In accordance with certain features of the present invention, two bridle beams are employed on opposite sides of the bolster, braking power being transmitted from a power source to one of said beams and being transmitted from the latter bridle beam to the other bridle beam by a connecting rod passing through an opening near the center of the bolster. This opening is the only one required in the bolster for the brake operating mechanism, so that the simple bolster now used in connection with conventional brake beam types of railway braking mechanisms may be employed.

The two bridle beams on opposite sides of the bolster are connected at their ends by means of flexible connections directly with the brake beam levers, thereby eliminating the four brake arms and the two push rods passing through the bolster employed in the constructions of the aforesaid applications Nos. 491,838 and 532,635.

Springs supported on equalizer bars bear on the brake head levers in directions to urge said levers away from braking positions and become automatically operative upon release of the braking power to move said levers away from braking positions. The stresses on these springs are adjustable.

Various other objects, features and advantages of the invention are apparent from the following description and from the accompanying drawings, in which Fig. 1 is a general top plan view of a railway car truck having a braking mechanism embodying the present invention, the view being shown diagrammatic with parts missing, such as the spring release devices and parts displaced from their actual position and somewhat distorted in size and shape to show more clearly the functional relationship of the parts shown;

Fig. 2 is a top plan view partly in horizontal section of a portion of the railway car truck with the improved braking mechanism of Fig. 1 shown more accurately and in greater detail, the scale of Fig. 2 being greater than that of Fig. 1;

Fig. 3 is a top plan view partly in horizontal section, showing the braking mechanism associated with a single car wheel, and the operating mechanism therefor, this view being part of the view of Fig. 2 but being shown on a larger scale;

Fig. 4 is a section of the braking mechanism taken on lines 4—4 of Fig. 3.

Fig. 5 is a detail section of an equalizer bar and guide thereon for a bridle beam, taken on lines 5—5 of Fig. 4;

Fig. 6 is a detail section of one of the spring devices for urging the corresponding brake head lever out of braking position, taken on lines 6—6 of Figs. 3 and 4 but shown on a larger scale;

Fig. 7 is a perspective of a spring-retaining cup forming part of the spring device illustrated in Fig. 6 but is shown on a larger scale;

Fig. 8 is a front elevation of one of the brake head levers forming part of the braking mechanism of the present invention;

Fig. 9 is a top plan view of the brake head lever shown in Fig. 8;

Fig. 10 is a section of the brake head lever taken on lines 10—10 of Fig. 9;

Fig. 11 is a section of the brake head lever taken on lines 11—11 of Fig. 9; and Fig. 12 is a section of the brake head lever taken on lines 12—12 of Fig. 9.

Referring to Figs. 1 to 4 of the drawings, there is shown a railway freight car truck comprising a pair of side structures or frames 10 having respective guide openings 11 to receive the ends of a truck bolster 12 extending between said frames and projecting at the ends into said openings, where they are supported on coil springs (not shown) and are guided by side columns 13 of said openings for vertical shock-absorbed movement. The bolster 12 is provided at its ends with lugs 14 engaging the inboard sides of the side columns 13 of the side frames 10 and lugs (not shown) engaging the outboard side of the side columns, these lugs guiding the bolster 12 for vertical movement.

The bolster 12 is also provided with a center conformation 16 for direct pivotal connection to the underside of the railway car body in conventional manner. Between the two side frames 10 and supported thereon by suitable bearings are two parallel axles 17 carrying at opposite ends flanged car wheels 18 which ride on rails 19 (Fig. 4).

The brakes for the four car wheels 18 of each car truck are operated by four similar brake head levers 20 (Figs. 1–4) symmetrically arranged and actuated from a single source of power. These brake head levers 20 are supported from respective brackets 21 flanking the bolster 12 and rigidly connected to the side frames 10 on opposite sides of the bolster guide openings 11. These brackets 21 can be forged or pressed and are welded or otherwise rigidly connected to the side frames 10 and each bracket is in the form of an L having a short leg 22 rigidly connected to a corresponding side frame column 13 and extending along the corresponding side frame 10 and a longer bracket leg 23 extending inwardly and transversely of said side frame substantially midway between the bolster 12 and the adjacent car wheel 18.

Each brake head lever 20 is desirably L-shape and has one leg 26 pivotally connected to the end of the bracket leg 23 by a hinge or pivot pin 27 to permit said lever to move horizontally about the axis of said pivot pin into and out of braking position and its other leg 28 carrying at its end a brake head 29. This brake head 29 carries a shoe 30 for application to a brake rotor or disc 31 which is affixed to the corresponding car wheel 18 on the inboard side thereof to stop said disc and which presents a brake face on its inboard side. The brake shoe 30 is mounted on the brake head 29 with a connection permitting limited pivotal movement of said shoe on said head and allowing thereby said brake shoe to adjust itself automatically into conforming surface contact with the brake disc 31 upon application of the brake. The details of construction of the brake head 29, the brake shoe 30, the brake disc 31 and the pivotal connection between the brake shoe and the brake head, is described more fully in the aforesaid copending application No. 491,838.

The brake head levers 20 are supported and steadied in their horizontal movements into and out of horizontal position, to prevent the application of destructive stresses to different parts of the mechanism and especially to the hinge pin 27, and the braking forces tending to distort the side frames 10 inwardly out of parallelism and out of alignment with the wheel journals are resisted, while permitting said side frames to shift relatively endwise as the wheels 18 round a curve. To that end, there are provided two horizontal equalizer bars 35 on opposite sides of the bolster 12, each bar pivotally connecting with the two side frame brackets 21 on the corresponding side of the bolster. For securing each equalizer bar 35 to the corresponding pair of side frame brackets 21, the two hinge pins 27, which pivotally connect the corresponding two brake head levers 20 to said brackets, also pass through the ends of the equalizer bar. To provide between each side frame bracket 21 and the corresponding brake head lever 20, a hinge connection permitting the corresponding end of the equalizer bar 35 to be pivotally secured to said connection, the bracket has a pair of axially spaced superposed projections 36 and 37, as shown more fully in Figs. 2, 3 and 4, disposed at opposite ends of a hub 38 at the end of the lever 20 to form a knuckle joint therewith. The projections 36 and 37 and the hub 38 are retained in interconnected pivotal relationship by the hinge pin 27 passing through axially aligned openings in said projections and said hub. The equalizer bar 35 is in the form of an angle bar, one horizontal leg 40 of which is seated at each end upon the lower projection 37 of the corresponding side frame bracket 21, while the other leg 41 extends downward from said projection, and the leg 40 has a hole at each end through which the corresponding hinge pin 27 passes.

To afford a large bearing area between the equalizer bar 35 at each end and the corresponding hinge pin 27, there is welded or otherwise affixed on the leg 40 of the equalizer bar at each end over the hole in said leg a collar 42 located between said leg and the hub 38 on the corresponding brake head lever 20 and embracing the hinge pin with a snug rotative fit. This collar 42 serves not only to provide extra bearing surface for the equalizer bar 35 but also serves to afford clearance for the support shoe on the corresponding brake head lever 20, as will be more fully described.

The equalizer bars 35 secured to the side frame brackets 21 through the hinge pins 27 as described, assist the bolster 12 in maintaining the truck side frames 10 in alignment or parallel to the respective rails. The equalizer bars 35 and the truck side frames 10 form a parallelogram, and since these are pivotally jointed through the brackets 21 and the hinge pins 27, they operate as a parallel motion mechanism permitting the side frames to shift relatively endwise and into limited angular positions with respect to the equalizer bars 35 when the wheels 18 are rounding a curve. The equalizer bars 35 also serve to support the weights of the brake head levers 20, thus relieving the hinge pins 27 from destructive bending stresses and to support and guide other parts of the braking mechanism, as will be more fully described.

Power is applied to the brake head levers 20 through a pair of similar bridle beams 43 disposed on opposite sides of the truck bolster 12. These beams 43 extend horizontally across the center line of the car truck with the middle points of said beams on said center line. For supporting the bridle beams 43 and guiding them for horizontal movement along the center line of the truck, each of the equalizer bars 35 has secured thereto two supports 44 (Figs. 2–5) spaced to seat thereon the corresponding bridle beam 43 at spaced regions thereof on opposite sides of its middle point. Each of these supports 44 comprises a lower angular mounting bracket 45 nested and seated against the two angular legs 40 and 41 of the equalizer bar 35 and firmly secured thereto, as for example, by rivets 46 and an upper horizontal leg 47 on which the flat beam 43 rests and across which said beam is guided horizontally in its slide movements in and out of brake applying position. The upper beam supporting legs 47 of the supports 44 could, if desired, have a certain amount of inherent resiliency to absorb some of the shocks transmitted to the bridle beam 43.

For applying power to the bridle beams 43, each of said bridle beams is integrally formed at its center region with a pair of pivot jaws or projections 50 (Figs. 2, 3 and 4) extending obliquely upwardly and defining therebetween a socket to receive the lower end of an inclined lever. One of the bridle beams 43 receives the lower end of an inclined somewhat upright live lever 51 in the socket between its pivot jaws 50 and is pivotally connected thereto by a pin. The upper end of this live lever 51 is pivotally connected at 52 to a pull or power rod 53 operated from a lever (not shown) of the air cylinder (not shown), which is supported in the usual manner on the car body and which forms part of the conventional air brake equipment.

Power is transmitted from the bridle beam 43 to which the live lever 51 is connected to the other bridle beam 43 by means of a connecting rod 54 pivotally connected at one end 55 to the intermediate section of the live lever 51 and pivotally connected at the other end 56 to the intermediate section of an inclined somewhat upright dead lever 57. The lower end of this dead lever 57 extends into the socket between the jaws 50 of the corresponding bridle beam 43 and is pivotally connected thereto by a pin, and the upper end of this lever is anchored to the truck bolster 12 by a flexible coupling 58. This flexible coupling 58 is shown comprising a bracket 60 rigidly connected to a side of the truck bolster 12, as for example, by rivets 61 and having a tongue 62 to which is pivotally connected a clasp or strap 63, interlinked with one end of a loop 64, the other end of which is interlinked with a clasp or strap 65 having a pivotal connection at 66 with the upper end of the dead lever 57. The flexible nature of the coupling 58 between the upper end of the dead lever 57 and the bolster 12, permits the bolster to move up and down, without distorting or bending the dead lever.

To assure that the braking forces applied to the four brake head levers 20 be equal, the ratio of the effective length $a$ (Fig. 1) of the live lever 51 to the length of its arm $b$ is the same as the ratio of the effective length $a'$ of the dead lever 57 to the length of its arm $b'$.

The connecting rod 54 passes through aligned openings 67 in the side walls of the bolster 12 near the center thereof, and each end of this rod is provided with two or more pivot holes 68 to permit adjustments in the effective length of this rod to compensate for wear, tolerances or manufacturing variations in the brake mechanism. The clasp 65 is similarly provided with a pair of pivot openings 69 to afford adjustments in the effective length of the flexible coupling 58 in accordance with changes made in the effective length of the connecting rod 54.

With the brake operating mechanism so far described, when the pull rod 53 is moved to the left (Figs. 1 and 2) as the result of the application of braking power, the bridle beam 43 to the right of the bolster 12 is moved to the right along its supporting guides 44 by the angular movement of the live lever 51 about its pivotal connection 55 to the connecting rod 54. At the same time, this connecting rod 54 is moved by this action endwise towards the left, thereby causing the bridle beam 43 to the left of the bolster 12 to be moved towards the left along its supporting guides 44 by the action of the dead lever 57 pivotally connected to said connecting rod and to the latter bridle beam.

The almost simultaneous operation of the two bridle beams 43 upon the application of the brake power through the pull rod 53 as described, is transmitted substantially simultaneously to the four brake head levers 20, to cause said levers to move about their pivotal supports 27 into braking position in relation to the brake discs 31. To effect the necessary connections between the bridle beams 43 and the brake head levers 20 for this purpose, each of the brake head levers has besides the two angularly related legs 26 and 28, a third stub leg 70 constituting an extension of the leg 26, this stub leg being preferably integral with the leg 26, although as far as certain aspects of the invention are concerned, said stub leg may be otherwise rigidly connected to the leg 26. The outer end of each lever leg 70 is connected to the adjacent outer end of the corresponding bridle beam 43 by means of a link 71, the ends of which are in the form of clevices straddling the outer end of said lever leg and the adjacent outer end of said bridle beam respectively, and pivotally connected to said lever leg and said bridle beam respectively. By means of this construction, each bridle beam 43 on each side of the bolster 12 is linked at its ends to a pair of brake head levers 20 on the same side of the bolster, to actuate said levers simultaneously into brake applying position, as the bridle beam moves laterally sideways away from the bolster 12 along the center line of the truck.

It should be noted that the bolster 12, aside from the aligned openings 67 in the side walls of the bolster 12 near the center thereof, requires no other openings. These bolster openings 67 correspond to the openings employed in the bolsters of brake mechanisms of the brake beam type, such as that of U.S. Patent No. 2,170,112. Since this simple type of bolster with openings near the center are now being employed in connection with the brake beam type of brake mechanism, it is seen that a switchover to a brake mechanism constructed in accordance with the present invention, does not entail the use of any special type of bolster.

It should also be noted that the construction of the present invention is much simpler than that of the aforesaid applications Nos. 491,838 and 532,635, since it requires no brake arm for each brake head lever and no push rods between opposed brake arms on opposite sides of the bolster.

The equalizer bars 35 serve, as already described, not only to hold the side frames 10 in alignment during brake application, while permitting said side frames to shift endwise in parallelism when rounding a curve, but also to support the bridle beams 43 in their movements away from and towards the bolster 12 in their brake applying and releasing operations. The equalizer bars 35 serve also the important function of supporting the weights of the brake head levers 20, thus relieving the hinge pins 27 from excessive stresses. To the latter end, each of the brake head levers 20 has a support shoe 75 (Figs. 2, 3, 4, 8, 9 and 11) at the bottom of the outer end of its leg 26 connected to the body of the brake head lever 20 by a flange 76 and seated on the top horizontal leg 40 of the corresponding equalizer bar 35. These support shoes 75 are desirably cast integral with their corresponding brake head levers 20 through the flange connections 76 but may be welded, riveted, bolted or otherwise rigidly secured to said levers. The shoes 75 support the outer ends of the legs 26 of the corresponding brake head levers 20, and thereby prevent excessive bending stresses from being transmitted to the hinge pins 27. The shoes 75 on the brake head levers 20 maintain the levers in horizontal position, thereby steadying said levers against vibration during normal running operations when the brakes are disengaged and also guide the levers horizontally in their brake applying and releasing movements.

If each of the brake head levers 20 is provided with a single support shoe 75 at the bottom, then although the brake head lever aside from the shoe may be placed interchangeably on either end of the bolster 12 or on either side thereof, when the brake head lever is placed on the opposite side of the bolster or at the opposite end of the bolster, it must be turned upside down, so that a shoe which was on the bottom side of the brake head lever when on one side of the bolster, at one end of the bolster, will be on the top side when on the opposite side of the bolster at the same end of the bolster. Under these conditions, it would be necessary to provide a left hand brake head lever and a right hand brake head lever. To avoid this, and to make all of the four brake head levers 20 on each truck interchangeable, each of the brake head levers has two similar support shoes 75 and 77, one on the bottom and one on the top in vertical alignment, the upper one being connected to the body of the brake head lever through a flange 78 as in the case of the bottom shoe 75. With the construction described, the brake head lever 20 on either side of the bolster or at either end of the bolster, will have a bottom support shoe in seating and supporting engagement with the corresponding equalizer bars 35, even though all of the brake head levers 20 are of the same construction and design.

As a feature of the present invention, positive spring releases are provided to move the brake head levers 20 out of braking positions upon the release of the braking power. Each of these releases comprises a plunger 80 (Figs. 2, 3, 4, 6 and 7) in the form of a bolt having a round head 81 at one end and threaded at the other end to receive a nut 82. Encircling the plunger 80 is a coil spring 83, one end of which bears against a washer or collar 84 on the plunger 80, the other end of which fits into a cup 85 provided with an end abutment wall 86 through which the plunger 80 slidably extends and bears against said wall. The spring 83 in its expanding movement, tends to move the plunger 80 towards the right, as shown in Fig. 6, this movement being limited by the stop engagement of the nut 82 with the end wall 86 of the spring cup 85. The force of the spring 83 can be regulated by means of the nut 82. This nut 82, although shown in simple form, is desirably of the castellated type, in which a cotter pin passing through the bolt is retained in selected slots in the nut to lock said nut in adjusted position.

The cup 85 is supported on the corresponding equalizer bar 35, and for that purpose has a bracket extension consisting essentially of a plate 88 bearing against the depending leg 41 of the equalizer bar and rigidly secured thereto, as for example, by means of rivets 90. The bottom of the spring cup 85 is formed with a flat surface 91 to seat firmly on the leg 40 of the equalizer bar 35. To impart structural rigidity to the cup 85, the bracket plate 88 has integral therewith along its sides a pair of ribs 92 flanking the nut 82.

For transmitting the force of each spring 83 to the corresponding brake head lever 20, each of said brake head levers has depending from the bottom of its leg 26 on the side thereof nearest the bolster 12 a lug 93. (Figs. 2, 3, 6, 8, 9 and 10), which is preferably integral with said lever, but which may be otherwise rigidly secured thereto. This lug 93 engages the plunger head 81 to serve as a tappet for the brake head lever 20.

With the construction described, upon application of the braking power through the pull or power rod 53, each of the brake head levers is moved angularly about its pivot support 27 in position to apply its brake shoe 30 to its corresponding brake disc 31, while compressing the spring 83 of the corresponding spring device. Since the springs 83 are compressed during the application of the brakes, upon release of the braking power, the springs are also released, causing them to return into expanded condition. These expanding movements of the released springs 83 are transmitted to the brake head levers 20 through the plungers 80 and lugs 93, causing said brake head levers to be moved positively about their pivot supports 27 out of braking positions and away from the corresponding brake discs 31. The springs 83 are not strong enough to add substantially to the force required to apply effectively the brakes but are strong enough to move positively the brake head levers 20 out of braking position clear of the corresponding brake discs 31 upon the release of the braking power.

The expanding movements of the springs 83 upon the release of the brakes are continued until the nuts 82 on the plungers 80 come into engagement with the end walls 86 of the spring retaining cups 85, as shown in Fig. 6. These are the limits of releasing movements of the brake head levers 20, so that the spring devices described serve not only to move positively the brake head levers out of braking position upon release of the braking power, thereby assuring that the brake shoes 30 do not remain in contact with the brake discs 31 upon release of the springs, but also serve to limit and predetermine the positions of the brake head levers 20 in brake released position.

Since the brake head levers 20 are intended to be interchangeable, so that they can operate on either side of the truck bolster 12 or at either end of the bolster truck, each of the brake head levers 20 is not only provided with a lower lug 93 but is also integrally provided with a similar upper lug 94 directly over the lower lug 93. The upper lug 94 is not active but comes into operation when the brake head lever 20 is disposed in position where this lug extends along the bottom. In this position, it cooperates with a spring release device as described to function, as already indicated.

While the invention has been described with particular reference to a specific embodiment, it is to be understood that it is not to be limited thereto, but is to be construed broadly and restricted solely by the scope of the appended claims.

What is claimed is:

1. In a railway car truck, the combination comprising a pair of side frames, car wheels supported on the side frames, brake discs on the inboard sides of said wheels respectively mounted for rotation with said wheels respectively and presenting respective brake faces on their inboard sides, a plurality of brake applying members for the brake discs respectively supported directly on said side frames for movements into and out of brake applying positions in relation to the car wheels respectively and exerting inward pressures to said side frames when in braking position, a bar extending between the side frames and holding said frames against inward movement towards each other, power-actuated means for moving the brake applying members into brake applying positions, and a spring release device for each of said brake applying members, each of said devices comprising a coil spring, a cup affixed to the bar and retaining therein an end section of the spring to serve as an abutment for one end of the spring, the other end of the spring bearing against the corresponding brake applying member, said coil spring having its line of action extending in a direction to urge the corresponding brake applying member out of brake applying position and to cause the coil spring to be stressed upon movement of the corresponding brake applying member into brake applying position.

2. As a new article of manufacture, a brake head lever for applying a brake on a car wheel in a railway car truck, said lever having three legs radiating from the main body thereof, the end of the first leg having a formation for pivot support, the second leg carrying a brake head for a brake shoe, and the third leg having a formation to receive braking power thereto by a member pivotally secured thereto, said first and third legs extending substantially in opposite directions from said second leg, and said second leg extending transversely to said first and third legs, said lever having on one of its legs a lug adapted to receive the force of a spring to move the lever out of braking position upon release of the braking power.

3. In a railway car truck, the combination comprising a pair of opposed side structures, a pair of coaxial car wheels supported on said side structures respectively with their axis fixed in relation to said side structures, brake discs located at the inboard sides of and rigid with said coaxial wheels respectively for rotation therewith, a pair of brake head levers for said brake discs respectively, a hinge connection between each brake head lever and the corresponding side structure supporting the latter brake head lever from the latter side structure for angular movements substantially horizontally about the axis of said hinge connection into and out of braking position in relation to the brake face on the corresponding brake disc, each of said brake head levers having three radiating legs extending substantially horizontally, the first leg carrying at its outer end at least part of its corresponding hinge connection and being supported at said outer end on the corresponding side structure through the corresponding hinge connection, said first leg extending along the axis of said wheels, the second leg extending transversely of said first leg and towards said wheel axis and carrying the brake head with the brake shoe thereon, and the third leg extending from the second leg in a general direction opposite to the direction of the first leg and along said wheel axis, and means for actuating said levers substantially simultaneously into braking positions and comprising a linkage extending between and connected to the ends of the third legs of said levers for moving said third legs about said hinge connections towards the wheel axis for brake applying operations.

4. In a railway car truck, the combination as described in claim 3, wherein said linkage comprises a bridle beam supported substantially horizontally and extending along said wheel axis, a link pivotally connecting each end of said bridle beam and the end of the third leg of the corresponding brake head lever and extending along but spaced from the second leg of the latter brake head lever, and means for moving said bridle beam horizontally and transversely towards the wheel axis for brake applying operations.

5. In a railway car truck, the combination of a pair of side structures, two sets of two coaxial car wheels supported on said side structures with their axes fixed in relation to said side structures, a truck bolster between the two sets of car wheels extending between the side structures, and means for applying brakes to the wheels comprising brake discs mounted on the inboard sides of said car wheels respectively for rotations therewith and presenting respective brake faces on their inboard sides, brake head levers for the brake discs respectively, a hinge connection between each brake head lever and the corresponding side structure supporting the latter brake head lever from the latter side structure for angular movements substantially horizontally about the axis of said hinge connection into and out of braking position in relation to the brake face on the corresponding brake disc, said brake head levers being arranged with a pair thereof located on one side of the bolster between the coaxial wheels on the latter side of the bolster and the bolster and supported from said side structures respectively through respective hinge connections, and the other pair of brake head levers being located on the other side of the bolster between the coaxial wheels on the latter side of the bolster and the bolster and supported from said side structures respectively through respective hinge connections, each of said brake head levers having three radiating legs extending substantially horizontally, the first leg carrying at its outer end at least part of its corresponding hinge connection and being supported at said outer end on the corresponding side structure through the corresponding hinge connection, said first leg extending along the bolster and being located between the bolster and the wheel to be braked by the lever, the second leg extending transversely of said first leg and away from the bolster and carrying the brake head with the brake shoe thereon, and a third leg extending from the second leg in a general direction opposite to the direction of the first leg and along said bolster, and means for actuating said brake head levers substantially simultaneously into braking positions and comprising linkages extending between the ends of the third legs of said brake head levers for moving said third legs about said hinge connections towards said bolster for brake applying operations.

6. In a railway car truck, the combination as described in claim 5, wherein said linkages comprise a pair of substantially horizontal bridle beams extending along the bolster and between the side structures on opposite sides of the bolster, the bridle beam on each side of the bolster extending between the brake levers on the same side of the bolster, links between the ends of the bridle beam on each side of the bolster and the third legs of the two brake head levers on the same side of the bolster, extending along but spaced from the second legs respectively on the latter two brake head levers, and means for moving said bridle beams horizontally and transversely substantially in unison away from the bolster for brake applying operations.

7. In a railway car truck, the combination comprising a pair of opposed side structures extending along the longitudinal direction of the truck, a plurality of wheels supported on said side structures, two of said wheels extending coaxially near opposite sides of the truck with their common axis extending between said side structures transverse to said longitudinal direction, means for resiliently supporting a railway car on the truck permitting the railway car to move up and down under resilient action relative to the side structures, brake discs located on the inboard sides of and rigid with said coaxial wheels respectively for rotation therewith, said brake discs presenting respective brake faces on the inboard sides thereof, a pair of brake head levers for said brake discs respectively, a hinge connection between each brake head lever and the corresponding side structure supporting the latter brake head lever from the latter side structure for angular movements substantially horizontally about the axis of said hinge connection into and out of braking position in relation to the brake face on the corresponding brake disc, means for actuating said levers into braking position, said brake head levers when in braking positions exerting pressures on said side structures through said hinge connections in directions having substantial components transverse to the longitudinal direction of the truck, a substantially horizontal bar extending between said side structures and pivotally secured near its ends to said side structures respectively, and a spring release device for said brake head levers supported on said bar and having spring means bearing against said bar and against said brake head levers, said spring means having their lines of action extending in directions to urge the brake head levers out of brake applying positions.

8. In a railway car truck, the combination as described in claim 7, wherein said brake head levers are supported on said bar at regions remote from the hinge axes of said brake head levers, whereby said levers are supported on said bar for substantially horizontal movement at said remote regions and the bending stresses on the hinge connections due to the weights of said brake head levers are thereby materially reduced.

9. As a new article of manufacture, a brake head lever for applying a brake on a car wheel in a railway car truck, said lever having three legs radiating from the main body thereof, the end of the first leg having a formation for pivot support, the second leg carrying a brake head for a brake shoe, the third leg having a formation to receive braking power thereto by a member pivotally secured thereto, said first and third legs extending substantially in opposite directions from said second leg, and said second leg extending transverse to said first and third legs.

10. As a new article of manufacture, a brake head lever as described in claim 9, wherein the first and third legs are substantially in alignment.

11. As a new article of manufacture, a brake head lever as described in claim 9, wherein a lug is provided on one of the legs integral therewith to receive the force of a spring to move the brake head lever out of braking position upon release of the braking power.

12. As a new article of manufacture, a brake head lever as described in claim 9, adapted to cooperate with and interchangeably similar to three other brake head levers for the four wheels of a four-wheel railway car truck arranged as two sets of coaxial wheels, said brake head lever having two similar lugs integral with one of its legs and extending from opposite faces of the brake head lever laterally thereof, either lug being adapted to receive the force of a spring to move the brake head lever out of braking position, the other lug serving the same purpose when the brake head is in one of its other interchangeable positions requiring it to be turned upside down.

13. In a railway car truck, the combination of a pair of side structures, two sets of two coaxial car wheels supported on said side structures with their axes fixed in relation to said side structures, a truck bolster between the two sets of car wheels extending between the side structures and means for applying brakes to the wheels comprising brake discs mounted on the inboard sides of said wheels respectively for movements with said wheels respectively and presenting brake faces on their inboard sides respectively, a pair of substantially horizontal bridle beams extending between the side structures on opposite sides of the bolster with the centers of said beams substantially on the center line of the truck, four brake head levers for applying the brakes to the brake faces of the brake discs respectively, a pair of the brake head levers being located on one side of the bolster for a corresponding set of coaxial car wheels and the other pair of brake head levers being located on the other side of the bolster for the other set of coaxial wheels, each of the brake head levers having three radiating legs, a first leg being located between the bolster and the corresponding car wheel and being pivotally supported on the corresponding side structure to cause the lever to move angularly and substantially horizontally, a second leg extending transversely to said first leg and carrying the brake head with brake shoe thereon and the third leg having a connection to the adjacent end of the corresponding bridle beam which is on the same side of the bolster as the brake head lever and extending from the second leg toward said connection in a general direction opposite to the direction of the first leg towards its pivot support, a substantially upright live lever on one side of the bolster having its lower end pivotally connected to the approximate center of the bridle beam on the same side of the bolster, a power rod pivotally connected to the upper end of the live lever, a substantially upright dead lever on the other side of the bolster, having its lower end pivotally connected to the approximate center of the other bridle beam on the same side of the bolster as the dead lever, and being pivotally supported at its upper end, a connecting rod pivotally connected at its ends to the intermediate sections respectively of the live lever and dead lever, whereby upon actuation of said power rod, said bridle beams are moved substantially horizontally and simultaneously causing the four brake head levers to move substantially simultaneously into braking positions in relation to said brake discs.

14. In a railway car truck, the combination as described in claim 13, wherein the connection between the third leg of each brake head lever and the adjacent end of the corresponding bridle beam comprises a link pivotally connected at its ends to the latter leg and the latter beam respectively and extending along but spaced from the leg of the latter brake head lever carrying the brake head and brake shoe.

References Cited in the file of this patent

UNITED STATES PATENTS

| | | |
|---|---|---|
| 1,073,390 | Byrd | Sept. 16, 1913 |
| 1,143,706 | Hedgcock | June 22, 1915 |
| 1,421,697 | Leah | July 4, 1922 |
| 1,620,508 | Ball | Mar. 8, 1927 |
| 2,131,703 | Cottrell | Sept. 27, 1938 |
| 2,226,507 | Baselt | Dec. 2, 1940 |
| 2,422,004 | Flesch | June 10, 1947 |
| 2,665,778 | Mueller | Jan. 12, 1954 |

FOREIGN PATENTS

| | | |
|---|---|---|
| 298,070 | Great Britain | Mar. 21, 1929 |